Oct. 31, 1933.  L. EIRICH ET AL  1,933,473
KNEADING, GRINDING, AND MIXING MACHINE
Filed May 23, 1932  2 Sheets-Sheet 1

Inventors:
Ludwig Eirich
&
Joseph Eirich
Attorney:

Oct. 31, 1933.    L. EIRICH ET AL    1,933,473
KNEADING, GRINDING, AND MIXING MACHINE
Filed May 23, 1932    2 Sheets-Sheet 2

Inventors:
Ludwig Eirich
&
Joseph Eirich.
Attorney:

Patented Oct. 31, 1933

1,933,473

UNITED STATES PATENT OFFICE 1,933,473

KNEADING, GRINDING AND MIXING MACHINE

Ludwig Eirich and Joseph Eirich, Hardheim, Baden, Germany

Application May 23, 1932, Serial No. 613,100, and in Germany June 20, 1931

3 Claims. (Cl. 83—45)

The invention relates to machines for kneading, grinding and mixing materials of various kinds, including clay, concrete, tar and bitumen, colours, sand, artificial fertilizers and so on, with or without liquid, and the invention is concerned with machines of the kind in which a rotary pan is used, having a central discharge aperture, with rotary appliances for the kneading, grinding or mixing operations supported above the floor of the pan around the central aperture, and with a stationary dam extending across the pan from the central aperture to the rim of the pan.

According to our invention the central aperture has around it a low wall, and adjoining the top of this wall there is a hollow, stationary cylinder, having at one part of its circumference an opening for passage of material from the pan to the discharge aperture, and driving mechanism is provided, enabling the speed of rotation of the pan to be varied, without varying the speed at which the kneading, grinding or mixing appliances are driven. Regulation of the speed of the pan regulates the period during which the material is retained in the pan while being carried from one side of the dam to the other side, where it can pass out through the opening in the central cylinder. The period of treatment can thus be regulated to suit the requirements of the material being treated, but the speed of the kneading, grinding and mixing appliances is not affected by this regulation, so that they are not slowed down when the treatment is to be protracted, and are not speeded up when the treatment is to be short.

The direction of rotation of the kneading, grinding or mixing appliances about their axes may be the same as that of the pan about its axis, or they may rotate in the opposite direction. In the latter case they have a more energetic agitating effect, as their outer portions beat or run against the material which is being swept around by the pan.

A shutter or cover may be provided for the opening in the central cylinder, so that the material can be caused to make two or more circuits with the pan, before the shutter is removed and discharge takes place. The dam may for this purpose be lifted, to allow the material to pass under it, or a low dam may be used, over which the material can pass.

Figure 1:
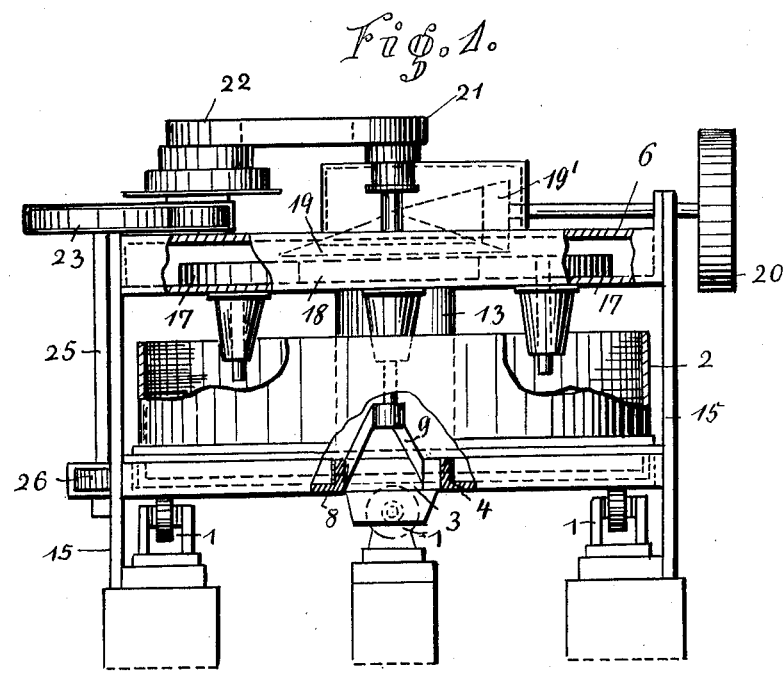

An example of apparatus according to the invention is shown in the annexed drawings, in which Fig. 1 is an elevation thereof, partly in section, with the mixing and kneading appliances removed.

Figure 2:
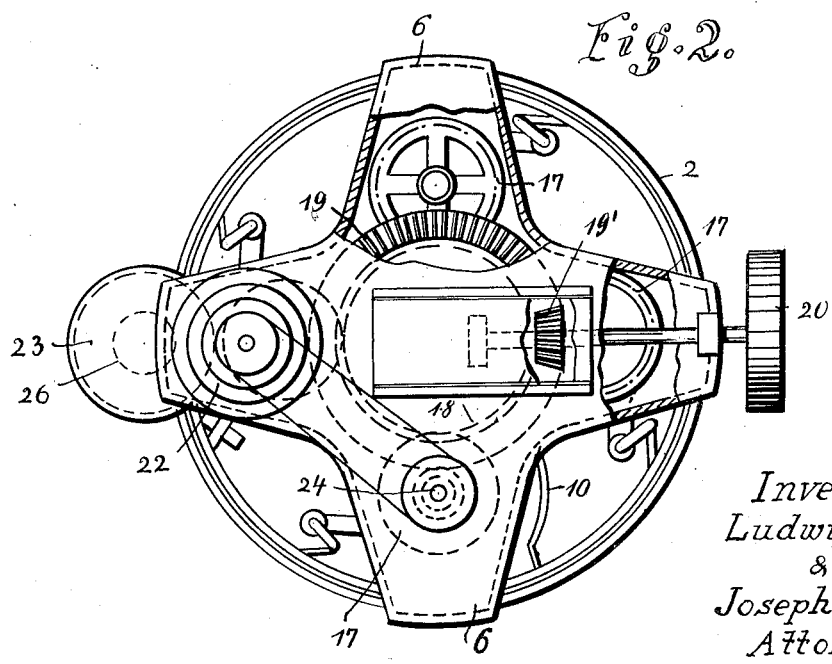
Figure 3:
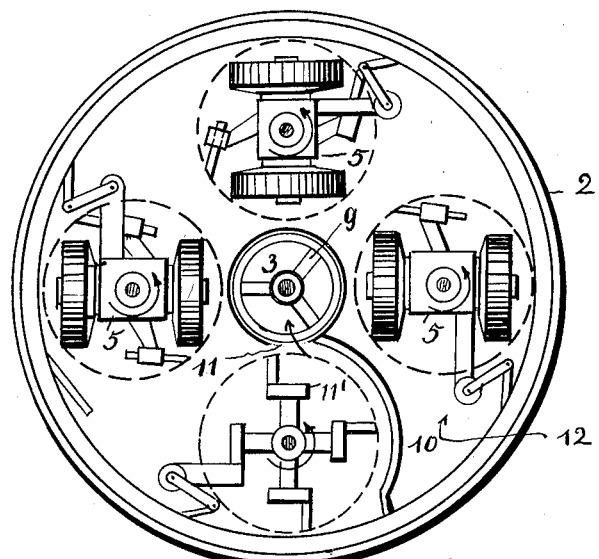
Figure 4:
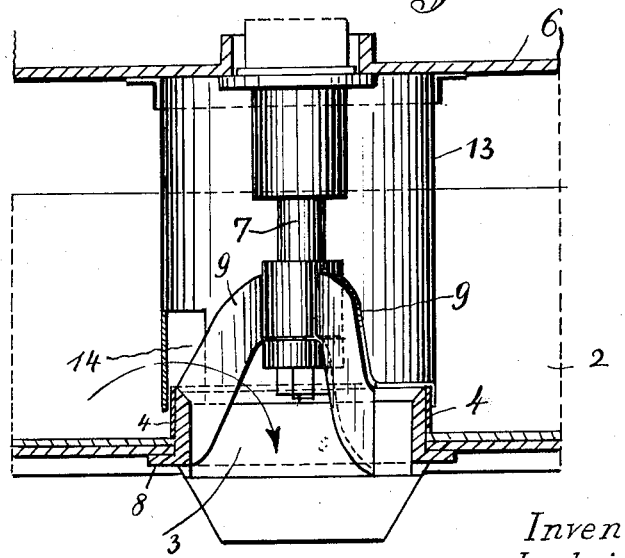

Fig. 2 is a plan view of the machine, partly in section,

Fig. 3 a plan view of the pan with the mixing and kneading appliances therein, and Fig. 4 a vertical section of part of the machine to a larger scale.

Four rollers 1 support the rotatable, circular pan 2, which has a central discharge aperture 3 surrounded by a low wall 4. Above the floor of the pan there are three pairs of edge runners 5, for kneading or grinding, and there is also a four-armed mixer 11'. A star-shaped member 6 of the frame, supported above the pan by pillars 15, has a spindle 7 mounted therein, and a holder 8 for the pan is connected to this spindle by a spider 9. The holder 8 fits into the central aperture of the pan, and has a flange on which the pan rests. The arms of the spider 9 are curved upwards from the holder 8, and allow plenty of space for passage of the material.

A stationary, hollow cylinder 13 fixed to the frame member 6 extends downwards into the pan, its bottom rim overlapping the top edge of the wall 4, except where the cylinder has an aperture 14 for the passage of material from the pan to the discharge aperture 3, as indicated by an arrow in Fig. 4, where the material is pushed over the wall 4 by the action of the kneaders and mixer. The aperture 14 can be closed by a sliding shutter or door.

Close to the mixer 11' a stationary dam 10 supported above the floor of the pan extends from one side edge of the aperture 14 to near the outer wall, the dam 10 being curved round part of the field of the mixer. The dam 10 is vertically adjustable, so that if desired a gap can be made between it and the floor, for passage of the material being treated.

The material to be treated is fed into the pan at 12 (Fig. 3), close to the dam, on the side where the floor of the pan is moving away from the dam, so that the material is carried round the central cylinder 13, past the kneaders 5, till it reaches the aperture 14 facing the mixer 11' and passes out through this aperture, unless the same is closed and the dam is sufficiently raised to allow the material to pass on, for another circuit. Instead of raising the dam, to allow material to pass under it if desired, arrangements may be made for changing the dam, by substituting a low one over which the material can pass. It will be seen that when the aperture 14 is open the period during which the material is treated in the pan can be regulated by regulating the speed of rotation of the pan. With the aperture open the operation can proceed continuously, that is to say with continuous feed of the material to be treated.

The kneaders and mixers are driven by gear wheels 17 meshing with a central gear wheel 18, the latter being driven by bevel gears 19, 19′ and a driving shaft with a pulley 20. Upon the shaft of one of the gear wheels 17 there is a step pulley 21 connected by a belt to a step pulley 21 driving a pinion meshing with a gear wheel 23 on a shaft 25, and a pinion 26 on this shaft meshes with a ring of teeth at the rim of the pan, for rotating the pan. The speed of rotation of the pan can accordingly be varied by shifting the belt, without varying the speed of the kneaders and mixer.

Instead of the star-shaped member 6 there may be a hood over the pan, with the driving gear mounted therein.

In some cases it may be desirable to knead and mix the material first in a dry state and then with an addition of liquid. Generally it is of advantage to use two machines in such cases, one being a dry mixer and the other a wet mixer, and the dry mixer may be mounted above the wet mixer, with a hopper or pipe delivering the material which it discharges to the wet mixer.

We claim:

1. A kneading, grinding or mixing machine, comprising a pan, said pan having a central circular discharge aperture in the bottom thereof, and an integral upwardly extending annular flange about said opening, means for rotating said pan, a stationary support having a portion thereof disposed above said pan, kneading, grinding, and mixing elements supported by said portion and extending into the pan, means for rotating said elements, a stationary hollow cylinder depending from said portion and above said aperture, the lower edge of said cylinder surrounding said annular flange, said cylinder having an opening in its circumference near the bottom, and means for closing said opening when desired.

2. A kneading, grinding or mixing machine, comprising a pan, said pan having a central circular discharge aperture in the bottom thereof, and an integral upwardly extending annular flange about said opening, means for rotating said pan, a stationary dam extending across the pan from the aperture to the outer rim, a stationary support having a portion thereof disposed above said pan, kneading, grinding, and mixing elements supported by said portion and extending into the pan, means for rotating said elements, a stationary hollow cylinder depending from said portion and above said aperture, the lower edge of said cylinder surrounding said annular flange, said cylinder having an opening in its circumference near the bottom, and means for closing said opening when desired.

3. A kneading, grinding or mixing machine, comprising a pan, said pan having a central circular discharge aperture in the bottom thereof, and an integral upwardly extending annular flange about said opening, means for rotating said pan, a stationary dam extending across the pan from the aperture to the outer rim, a stationary support having a portion thereof disposed above said pan, kneading, grinding, or mixing elements supported by said portion and extending into the pan, means for rotating said elements, said means being adjustable to vary the speed of rotation, a stationary hollow cylinder depending from said portion and above said aperture, the lower edge of said cylinder surrounding said annular flange, said cylinder having an opening in its circumference near the bottom, and means for closing said opening when desired.

LUDWIG EIRICH.
JOSEPH EIRICH.